Figure 1:
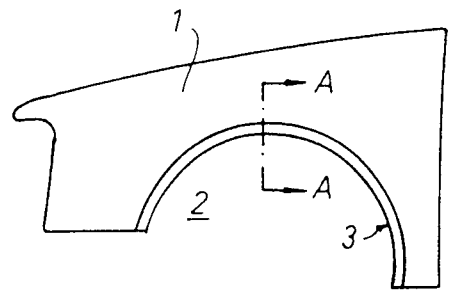

United States Patent [19]

Hensel

[11] Patent Number: 4,715,648

[45] Date of Patent: Dec. 29, 1987

[54] ARRANGEMENT FOR INCREASING THE BODY WIDTH AT WHEEL HOUSINGS OF A VEHICLE

[75] Inventor: Werner Hensel, Trollhättan, Sweden

[73] Assignee: Saab-Scania Aktiebolag, Sodertalje, Sweden

[21] Appl. No.: 915,517

[22] Filed: Oct. 6, 1986

[30] Foreign Application Priority Data

Oct. 4, 1985 [SE] Sweden ............................. 8504603

[51] Int. Cl.⁴ ............................................. B62D 25/00
[52] U.S. Cl. .................................... 296/198; 293/128; 280/153 B
[58] Field of Search ............... 293/128 X; 296/198 O, 296/199; 280/153 B X

[56] References Cited

U.S. PATENT DOCUMENTS 4,514,003 4/1985 Guy ..................................... 293/128
4,572,558 2/1986 Chupick ............................. 293/128

FOREIGN PATENT DOCUMENTS 1906874  9/1970 Fed. Rep. of Germany ... 280/153 B
1929939 12/1970 Fed. Rep. of Germany ... 280/153 B
  73,759  6/1955 United Kingdom ............ 280/153 B

*Primary Examiner*—Robert R. Song

*Attorney, Agent, or Firm*—Cushman, Darby & Cushman

[57] ABSTRACT

The invention relates to an arrangement for extending the fenders on a vehicle body equpipped with a trim detail gripping round an edge of the body at the wheel housing opening.

Modification to the wheel suspension of a motor vehicle can require increasing the width of the vehicle at the wheels, which requires an increase of the body width. Fitting fender extenders to the body by means of welding or screwing results in considerable operations on the body, the original rust protection of which is thus deteriorated.

The present invention has the object of increasing the body width of a vehicle by fitting fender extenders and/or similar body members. Fitting is readily performed and requires no operations to be made on the body itself. The object is achieved by the trim detail at the wheel housing being at least partially surrounded by a body member which in the transverse direction of the body extends beyond the trim detail and by said member being provided on either side of the edge with abutments gripping round and coacting with abutments or the like on the trim detail for locating and fixing the body member to the trim detail.

8 Claims, 2 Drawing Figures

ARRANGEMENT FOR INCREASING THE BODY WIDTH AT WHEEL HOUSINGS OF A VEHICLE

The present invention relates to an arrangement for increasing the body width at wheel housings of a vehicle body provided with a trim detail gripping round an edge of the body at a wheel housing opening.

Vehicle bodies are usually made so that their wheel housings extend laterally beyond the vehicle wheels. When the vehicle is modified so that the vehicle width at the wheels is increased, the width of the body must increase to a corresponding extent. Such vehicle modifications may be needed, e.g. for alterations in brake disks, felloe width and/or tire dimensions.

An alteration in the configuration of the body itself requires extensive and costly alterations of press tools and the like. However, this may be avoided if only a minor widening of the body is necessary. The simplest and most usual method of achieving such widening is by fitting so-called fender extenders. These may be made from sheet metal, which is welded or screwed to the body. Screwing is most usual if the extender is made from plastics. The fitting of such items results in that certain metal surfaces on the body must be uncovered, and the rust protective coating at these places will be deteriorated as a consequence. Since the areas round the wheel housing are particularly subject to corrosion, these known solutions result sooner or later in the appearance of rust around the points of attachment of the extender to the body.

The present invention has the object of enabling the attachment of fender extenders and similar body members to a vehicle body without any operations on the body itself being required. In this way the body may be given proper rust protection during manufacture, and this protection is not deteriorated by fitting fender extenders.

In accordance with the invention this is achieved by the trim detail at least on its exterior being surrounded by a body member which in the transverse direction of the body extends beyond the trim detail and by the body member being formed with abutments on either side of the edge, said abutments gripping round and coacting with abutments or the like on the trim detail for locating and fixing the body member to the trim detail.

By attaching a fender extender or a similar body member to a detail fastened to the body, operations on the body itself are avoided entirely, and by forming the body member with interior abutments it is possible readily and rapidly to fit it by snapping the abutments onto complemental abutments on the detail. In accordance with an advantageous embodiment of the invention, attachment of the body member can also be performed with screws. By forming and preparing the detail with this in mind, operations on the body are avoided here too, while making possible a more secure attachment.

Figure 2:
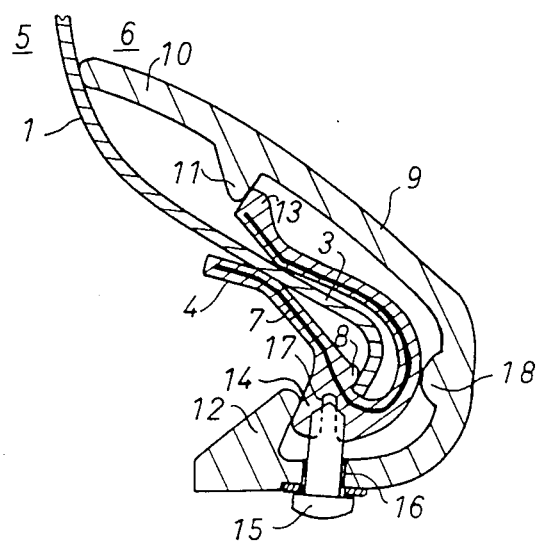

Further distinguishing properties and advantages of the invention will be apparent from the following description of an embodiment, made with reference to the accompanying drawings, on which FIG. 1 is a side view of a motor vehicle fender, and FIG. 2 is a cross section A—A according to FIG. 1 of a fender extender arranged at a wheel housing.

In FIG. 1 there is illustrated a front fender 1, which is a part of a passenger car body. The fender 1 is made from sheet metal and is formed with a wheel housing opening 2 limited by an arcuate peripheral edge 3.

FIG. 2 is a cross section A—A according to FIG. 1 of the edge 3 at the wheel housing opening 2. A plastics wheel housing trim detail 4 is fastened to the fender 1, and has a substantially U-shaped cross section. It engages against the inside 5 of the fender 1 as well as the outside 6 thereof, while being fastened to the edge 3. In order to further ensure this fastening the trim detail 4 is internally provided with a bead 8 adjacent to an arcuate outer portion of the trim detail 4, which embraces an outer, angularly folded edge on the fender 1. Moulded into the trim detail 4 there is an aluminium reinforcing strip 7, which also has a U-shaped cross section. The primary object with the reinforcing strip 7 is to facilitate manufacture of the trim detail 4, but of course it also contributes to some extent in increasing the strength of the trim detail. The space enclosed by the trim detail 4, also accommodating the edge 3 of the fender 1, is filled with rust-protective grease (not illustrated) when the trim detail is fitted.

In accordance with the invention, a body member in the form of a so-called fender extender 9 is removably attached outside the trim detail 4. In the embodiment shown the fender extender 9 is configured such that only a minor increase of the body width is afforded in the transverse direction of the trim detail 4 and the fender extender 9. In other embodiments the fender extender 9 may of course be formed to give a greater increase in body width.

The fender extender 9 too has a U-shaped cross section, its two legs embracing the trim detail 4. An upper edge 10 on the fender extender 9 abuts the fender 1. On the inside the fender extender is formed with two longitudinal abutments 11,12 extending along the whole of its arcuate length. Each of the legs of the fender extender includes one of the abutments 11,12, which are thus situated on either side of the edge 3. The upper abutment 11 engages against an upper edge 13 on the trim detail 4, while the lower abutment 12 engages against a bead 14 on the trim detail 4. In this way the fender extender 9 can be readily fitted, by snapping the abutments 11,12 against the upper edge 13 and the lower bead 14, respectively, of the trim detail 4. The two abutments 11,12 then grip round the edge 13 and the bead 14, respectively, on the trim detail 4, the fender extender 9 thus being clamped against the trim detail 4 by its own elasticity. To secure the attachment of the fender extender 9 to the wheel housing opening, there are also used a plurality of screw joints 15 at a suitable pitch along the fender extender, there being provided through-holes 16 in the fender extender. The screws 15 of the screw joints engage in a longitudinal groove 17 in the trim detail 4. This groove 17 is made in the bead 14 of the trim detail 4, sufficient footing for the screws thus being obtained without them needing to be screwed through the trim detail 4. Between the two abutments 11,12, the fender extender 9 is formed with an interior bead 18 that abuts the outer face of the trim detail 4. This bead 18 constitutes a spacer ensuring the lateral location of the fender extender 9 in relation to the trim detail 4. The bead 18 should therefore engage against the outmost part of the trim detail 4, as seen in the transverse direction.

In the embodiment described, the wheel housing trim detail 4 is prepared for accommodating the fender extender 9, and consequently the latter can be fitted without any operations being required that deteriorate the rust protection of the fender 1. The inventive arrangement also permits the extender 9 to be readily replaced, should it be damaged, and also the fender extender does not need to have any further treatment if it is taken off. The invention also permits the same basic body to be used for vehicles having different tracks and that the width at the wheel housings can be adapted to actual replacements.

The invention can be implemented differently from the embodiment described above as an example, while still keeping within the scope of the following claims. The area of application for the invention is not restricted to fender extenders for vehicle bodies, but can also be utilized and applied to other body members.

I claim:

1. Arrangement for increasing the body width at wheel housings of a vehicle body provided with a trim detail gripping round an edge at a wheel housing opening, characterized in that the trim detail is of substantially U-shaped cross section, said trim detail being at least partially surrounded by a body member which is also of substantially U-shaped cross section and which in the transverse direction of the body extends beyond the trim detail and which is formed with abutments on the inner surface thereof on either side of the edge, said abutments gripping round and coacting with abutments or the like on the trim detail for locating and fixing the body member to the trim detail.

2. Arrangement as claimed in claim 1, characterized in that each leg of the U-shaped body member includes at least one of the abutments.

3. Arrangement as claimed in claim 2, characterized in that the abutments on the body member extend along the entire length of the body member.

4. Arrangement as claimed in claim 3, characterized in that one of the abutments on the body member engages against an upper edge on the trim detail.

5. Arrangement as claimed in claim 3, characterized in that one of the abutments on the body member engages against a bead on the trim detail.

6. Arrangement as claimed in claim 3, characterized in that between the abutments the body member is formed with a bead engaging against the trim detail.

7. Arrangement as claimed in claim 5, characterized in that the bead on the trim detail is formed with a longitudinal groove, in which engage a plurality of screw means passing through the body member, thus to further fix the body member.

8. Arrangement as claimed in claim 6, characterized in that the bead on the body member is adapted to engage against the transversely outmost part of the trim detail, thus to locate the body member substantially in the transverse direction.

* * * * *